United States Patent [19]

Frutiger

[11] 4,151,469
[45] Apr. 24, 1979

[54] APPARATUS EQUIPPED WITH A TRANSMITTING AND RECEIVING STATION FOR GENERATING, CONVERTING AND TRANSMITTING SIGNALS

[75] Inventor: Peter Frutiger, Wangen, Switzerland

[73] Assignee: Anstalt Europaische Handelsgesellschaft, Vaduz, Liechtenstein

[21] Appl. No.: 834,707

[22] Filed: Sep. 19, 1977

Related U.S. Application Data

[63] Continuation-in-part of Ser. No. 567,539, Apr. 14, 1975, abandoned, which is a continuation-in-part of Ser. No. 327,298, Jan. 29, 1973, abandoned.

[30] Foreign Application Priority Data

Feb. 1, 1972 [CH] Switzerland ............ 141572/72

[51] Int. Cl.² ............................................. H04B 1/64
[52] U.S. Cl. .......................... 325/38 R; 179/15 AV; 325/62; 325/141; 332/9 R
[58] Field of Search .............. 325/38 R, 42, 43, 62, 325/141, 187; 179/15 AP, 15 AV; 332/9 R, 11 R

[56] References Cited

U.S. PATENT DOCUMENTS

| | | | |
|---|---|---|---|
| 3,560,659 | 2/1971 | Greefkes | 325/42 |
| 4,071,826 | 1/1978 | Miller, Jr. | 325/43 |

Primary Examiner—John C. Martin
Assistant Examiner—Marc E. Bookbinder
Attorney, Agent, or Firm—Ostrolenk, Faber, Gerb & Soffen

[57] ABSTRACT

A transmitting and a receiving station for generating, converting and transmitting and receiving speech signals are disclosed. The transmitting station includes a transducer for converting an acoustical signal into an analogue electrical signal and a band limiting filter for filtering out those components of the analogue electrical signal which have frequencies falling above or below a predetermined frequency band. An emphasizing circuit adjusts the amplitude of those frequency components of the band limited analogue electrical signal falling within the predetermined frequency band such that the power of each of the components is substantially equal. A syllabic amplitude compressor having a forward acting regulation time constant which is greater than its backward acting regulation time constant regulates the amplitude of the adjusted, band limited, analogue electrical signal. An analogue-to-digital converter samples the regulated, adjusted, band limited electrical analogue signal at a sampling rate which is less than twice the maximum of frequency of the predetermined frequency band. The analogue-to-digital converter has a non-linear quantization characteristic with smaller quantizing steps at signal input levels of smaller magnitude and larger quantizing steps at signal input levels of higher value.

7 Claims, 10 Drawing Figures

Fig. 1
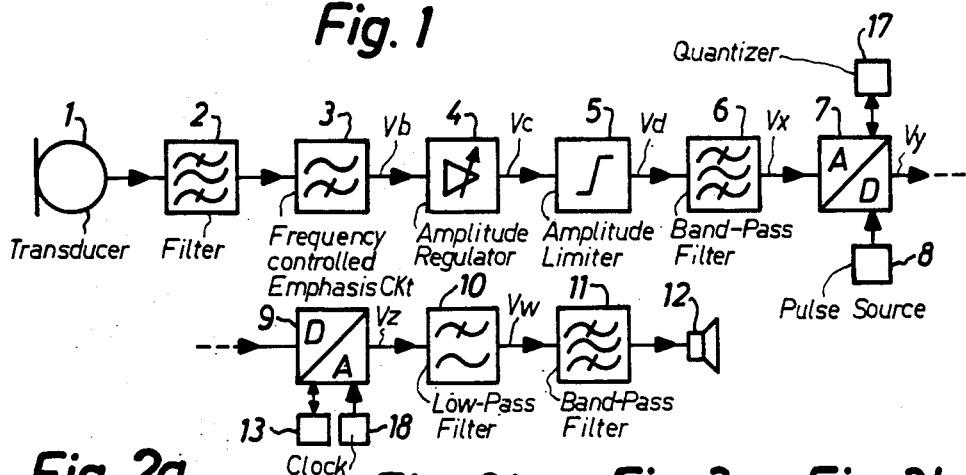
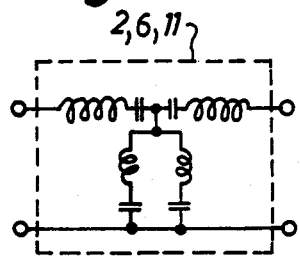
Fig. 2a
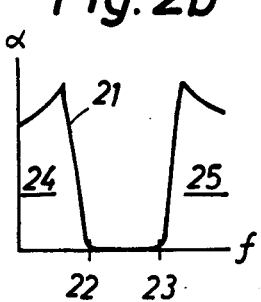
Fig. 2b
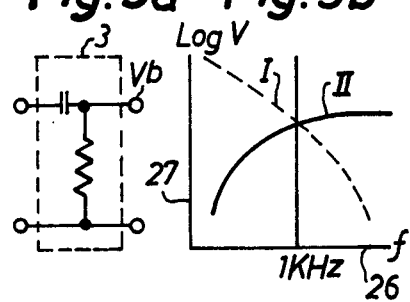
Fig. 3a  Fig. 3b
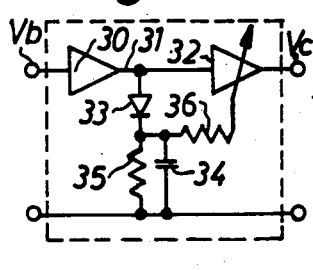
Fig. 4a
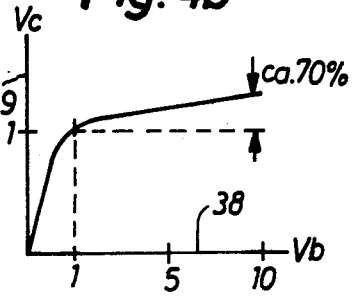
Fig. 4b
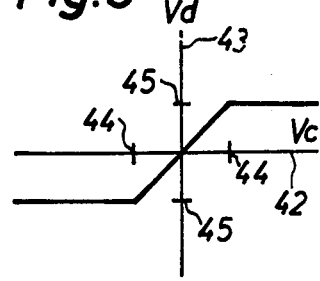
Fig. 5
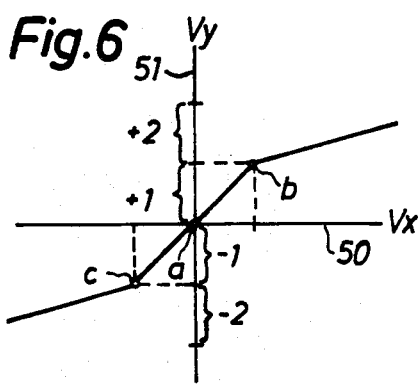
Fig. 6
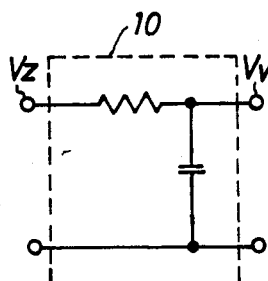
Fig. 7a
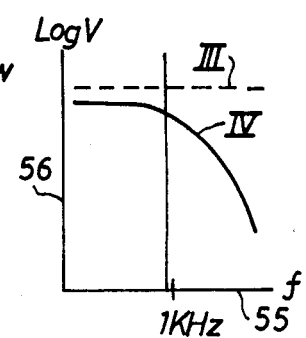
Fig. 7b

APPARATUS EQUIPPED WITH A TRANSMITTING AND RECEIVING STATION FOR GENERATING, CONVERTING AND TRANSMITTING SIGNALS

RELATED APPLICATIONS

The present application is a continuation-in-part of U.S. patent application Ser. No. 567,539, filed Apr. 14, 1975, now abandoned which is a continuation-in-part of U.S. patent application Ser. No. 327,298, filed Jan. 29, 1973, now abandoned.

BACKGROUND OF THE INVENTION

The present invention relates to intelligence transmission and reception apparatus and more particularly to a novel apparatus incorporating a transmitting and a receiving station utilizing pulse code modulation (PCM) for generating, converting and transmitting intelligence signals.

It is known in the art that transmission systems utilizing pulse code modulation (PCM) possess an advantage, relative to signals transmitted with analogue modulation, in that the signal-to-noise ratio at the receiving equipment is dependent only upon the quantization noise and not upon noise introduced into the transmission network.

With known transmission systems, the analogue signal to be transmitted is sampled to obtain a sequence of amplitude values and the individual amplitude values are then converted into suitable pulse code words or messages to be transmitted to the receiver. According to known sampling theory, the frequency of the individual scanning samples should be at least twice as great as the maximum frequency of the analogue signal to be transmitted. These conditions have frequently been found to be quite disturbing for reasons associated with transmission technology, since neither the pulse frequencies resulting from the required scanning frequency nor the number of information bits per scanning pulse, should exceed a certain value.

SUMMARY OF THE INVENTION

In accordance with the present invention, a transmitting station is equipped with a transducer for converting an acoustical signal into an electrical signal and a band-limiting filter for filtering out those components of the analogue-electrical signal which fall above or below a predetermined frequency band. An emphasizing circuit adjusts the amplitude of those frequency components of the band limited analogue-electrical signal falling within the predetermined frequency band such that the power of each of the components is substantially equal. A syllabic amplitude compressor having a forward acting regulation time constant which is greater than its backward acting regulation time constant regulates the amplitude of the adjusted, band limited analogue electrical signal. Particularly, the amplitude regulator means amplifies positive going changes in the amplitude of the signal applied to its input at a rate which is faster than the rate at which it amplifies negative going changes in the amplitude of the signal applied to its input. An analogue-to-digital converter samples the regulated, adjusted, band limited electrical analogue signal at a sampling rate which is less than twice the maximum frequency of the predetermined frequency band. The analogue-to-digital converter has a non-linear quantization characteristic with smaller quantizing steps at signal input levels of smaller magnitude and larger quantizing steps at signal input levels of higher magnitude.

It is therefore one object of the present invention to provide an improved apparatus having a transmitting station and a receiving station in which the transmitting station generates, converts and transmits signals of a pulse code modulated nature without being limited by the prior art pulse sampling frequencies and number of data bits per sampling pulse.

It is another object of the present invention to provide such a system which overcomes the prior art limitations without reducing the quality of the original analogue signal transmitted in PCM.

These and other objects of the invention will become readily apparent from the following description of the drawings.

BRIEF DESCRIPTION OF THE DRAWINGS

FIG. 1 is a block diagram illustrating a preferred embodiment of apparatus equipped with a transmitting station and a receiving station for generating, converting, and transmitting signals in accordance with the invention;

FIGS. 2a and 2b are a schematic diagram and an attenuation-versus-frequency curve, respectively, for one embodiment of a band pass filter which may be utilized in the apparatus of FIG. 1;

FIGS. 3a and 3b are a schematic diagram and a frequency response curve, respectively for one four-terminal network which may be used in the apparatus of FIG. 1;

FIGS. 4a and 4b are a schematic diagram and a transfer characteristic, respectively, for an automatic volume regulating means, also called syllabic compressor, which may be used in the apparatus of FIG. 1;

FIG. 5 is a transfer curve of an amplitude limiter which may be used in the apparatus of FIG. 1;

FIG. 6 is a transfer curve illustrating the input to output transfer characteristics of the analogue-to-digital converter used in the apparatus of FIG. 1; and FIG. 7 depicts a schematic diagram of a low pass, or de-emphasis, filter, used in the apparatus of FIG. 1.

DETAILED DESCRIPTION OF THE INVENTION

Figure 8:
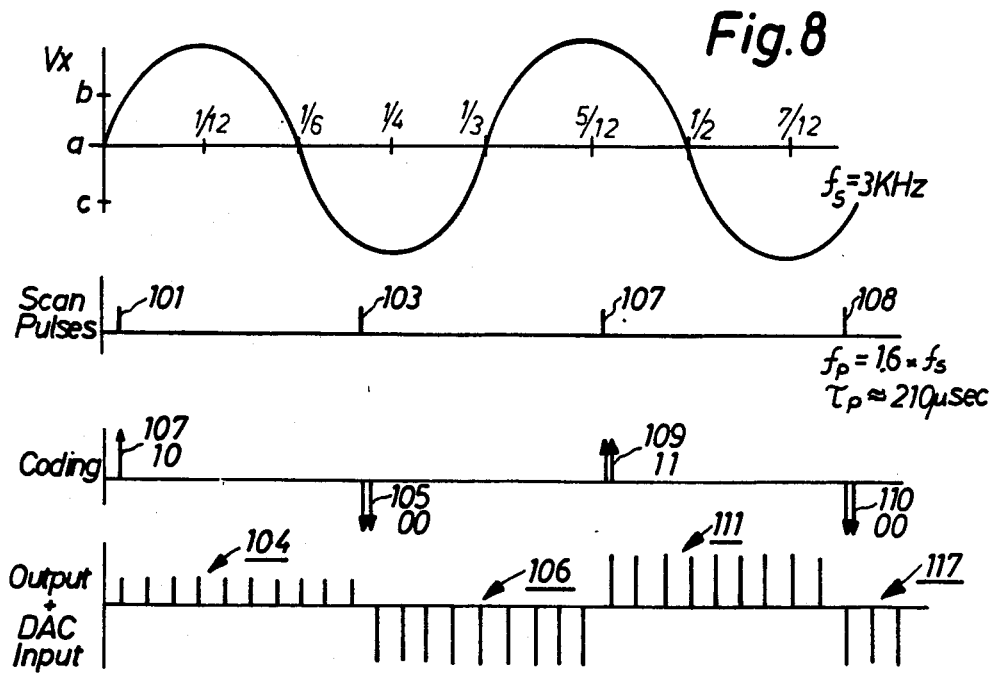
Figure 9:
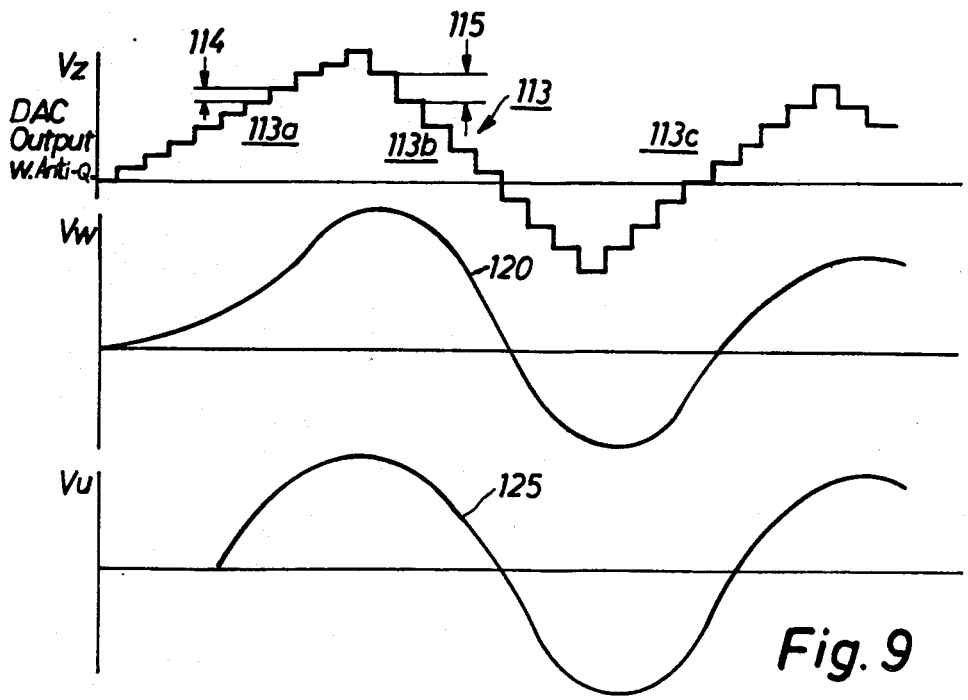

Referring now to the drawings wherein like numerals indicate like elements, the transmitting station of the apparatus contains, in a preferred embodiment illustrated in FIG. 1, an electro-acoustical transducer 1 serving to receive acoustical signals, such as speech signals and the like, which electro-acoustical transducer 1 is preferably a dynamic microphone having background noise compensation and a power gain of approximately 10 dB. The analogue signals generated by microphone 1 are coupled to a band-pass filter 2, which band-pass transmits, i.e. passes, only these frequencies within the desired pass-band and attenuates all frequencies above and below the pass-band limits. A circuit for a known band-pass filter 2, such as may be derived from *The Radio Engineers Handbook,* Terman (1943), pages 227–231, is illustrated in FIG. 2a. FIG. 2b illustrates the associated attenuation ($\alpha$) versus frequency (f) curve 21 of band-pass filter 2, illustrating the well-known passband region of low attenuation between a lower frequency limit 22 and an upper frequency limit 23 and the associated high attenuation of frequencies in region 24, which frequencies are less than lower band frequency limit 22, and for frequencies in region 25, which frequencies are greater than upper band frequency limit 23. The frequencies transmitted by band-pass filter 2 are preferably in the range of 0.3 to 3 kHz.

The band-limited signal from filter 2 is coupled to a four-terminal network 3 which increases the amplitude of signals having frequencies in the upper frequency range of the frequency band to be transmitted. The value of this signal amplitude increase, or gain, by four-terminal network 3 amounts, in a preferred embodiment, to about 10 dB, whereby the amplitude of the acoustical signals received by microphone 1 has been increased by approximately 20 dB for the higher frequencies in the pass-band. As a result, the four-terminal network 3 serves to adjust the amplitude of those frequency components of the band limited analogue electrical signal falling within the predetermined frequency band of the filter 2 such that the power of each of the frequency components is substantially equal. FIG. 3a illustrates one of many usable four-terminal networks 3. FIG. 3b is a graph having frequency (f) plotted along its abscissa 26 and the logarithm of the signal voltage amplitude plotted along the ordinate 27. A broken-line curve 1 illustrates the spectrum distribution of the acoustical signal at the input of microphone 1; the solid line curve II illustrates the spectrum distribution of the signal voltage (Vb) at the output of four-terminal network 3, which is designed both to maintain the amplitude essentially unchanged at a frequency of 1 kHz and to increase the signal output voltage amplitude as a function of frequency, for frequencies above 1 kHz.

The output of four-terminal network 3 is coupled to an automatic amplitude regulator 4 which operates as a syllabic amplitude compressor. Syllabic amplitude compressor 4 advantageously possesses a forward acting, or "attack," regulation time constant differing from a backward acting, or "release," regulation time constant. The forward acting regulation time constant should be between 100 and 500 milli-seconds and the backward acting regulation time constants between 20 and 80 milli-seconds. In a preferred embodiment, based upon the previously given acoustical and electrical data, these time constants are preferably about 150 milli-seconds for the forward acting regulation time constant and about 50 milli-seconds for the backward acting regulation time constant.

FIG. 4a illustrates a general form of syllabic amplitude compressor 4, as is described in the aforementioned *Radio Engineers Handbook* at page 412, wherein input voltage (Vb) is amplified by device 30 whose output 31 is connected in common to a voltage-controlled amplifier 32 and a diode rectifier 33. The rectified voltage from diode 33 is applied to a filter consisting of capacitor 34 and shunt resistor 35 having an "attack" time constant, determined by the values of capacitor 34 and resistor 35, which determines the delay before an increasing gain control voltage will decrease the overall gain applied to input signal Vb. As the amplitude of input voltage Vb decreases and diode 33 no longer conducts, capacitor 34 discharges through series resistor 36, with the "release" time constant, determined by the values of capacitor 34 and resistor 36, determining the time required for control amplifier 32 to recover full gain for a low amplitude signal immediately following a signal with a sufficiently high amplitude to cause considerable increase in the amplification of controlled amplifier 32. Thus, the amplitude regulator time constants are established to control both the amount of compression and the speed of compression on set and release.

FIG. 4b illustrates the static characteristics of amplitude regulator 4, where input voltage Vb is plotted in volts along abscissa 38 while output voltage Vc, standardized to the value 1 for an input voltage Vb of one volt, is plotted along ordinate 39. Characteristic curve 40 illustrates the generally constant gain for all input voltages up to approximately one volt at which point diode 33 conducts and the filtered voltage across capacitor 34 begins to reduce the gain of control amplifier 32, whereby for a larger input voltage Vb the output voltage Vc has only a slightly increasing amplitude, being about a 20% output increase for a 900% input increase.

The combination of four-terminal network 3 and syllabic amplitude compressor 4 yields a nearly uniform frequency and amplitude distribution for the electrical analogue signals. Any briefly appearing disturbing amplitude peaks at the output of amplitude regulator 4 are eliminated by an amplitude limiting device 5 coupled to amplitude regulator 4. Limiter 5 serves to clip any brief amplitude peaks in excess of a certain value, as illustrated by the amplitude limiter transfer characteristics in FIG. 5, where amplitude limiter input voltage Vc is plotted along abscissa 42 and amplitude limiter output voltage Vd is plotted along ordinate 43. As is well known, all input signals Vc having an amplitude less than the limiting voltage will pass undisturbed through amplitude limiter 5, while input voltages greater than limiting voltage 44 will be clipped to an output voltage Vd never exceeding maximum output voltage 45. This limiting process causes frequency components to be generated above the 3 kHz band limit, which high frequency components are filtered out by a second band-pass filter 6, having a circuit and a frequency attenuation characteristic as previously described for band-pass filter 2.

The analogue signal in the output of band-pass filter 6 is fed to analogue-to-digital converter (ADC) 7 which has a non-linear compression characteristic and which receives sampling pulses from a clock pulse source 8. The frequency of the sampling pulses is chosen to be less than the Nyquist frequency, i.e. less than twice the maximum frequency present in the intelligence frequency band to be transmitted. In the preferred embodiment, the maximum transmitted frequency is 3 kHz and the sampling frequency is chosen to be 1.6 times this maximum frequency or a sampling frequency of 4.8 kHz. According to known sampling theory, the sampling frequency in this case must be at least the Nyquist frequency, or 6 kHz.

The non-linear compression characteristics of analogue-to-digital converter 7 means that the quantizing steps for certain signals located in the mean amplitude range are smaller than for signals having a higher amplitude. Stated otherwise, the analogue-to-digital converter has a non-linear quantization characteristic with smaller quantizing steps at signal input levels of smaller magnitude and large quantizing steps at signal input levels of higher magnitude. Analogue-to-digital converters of the foregoing type are well known in the art. One such converter is illustrated and described in U.S. Pat. No. 2,889,409, FIGS. 6 and 10. The non-linear transfer characteristics of the converter illustrated in U.S. Pat. No. 2,889,409 is illustrated in FIG. 8 thereof. Further examples of such converters are also disclosed in U.S. Pat. No. 3,688,221. In view of the fact that each amplitude sample taken from the analogue signal at the input of analogue-to-digital converter 7 is handled instantaneously, such a converter is also named an analogue-to-digital converter with instantaneous behavior, as explained in Column 1 of U.S. Pat. No. 3,298,017.

The analogue-to-digital converter 7, in a preferred embodiment, yields a two-bit binary coded output, using four binary code notations to characterize the amplitude value of each sampled voltage, namely the codes "00," "01," "10," and "11." The quantization characteristic of device 7 yields these four two-bit binary representations as illustrated in FIG. 6, where the input voltage Vx to ADC 7 is plotted along abscissa 50 and the converter output voltage Vy is plotted along ordinate 51. For input signals Vx with amplitude located in a range bounded by a first predetermined value a and a second predetermined larger value b, there is produced a constant output signal of value +1, corresponding, for example, to the code value "10." For a corresponding input voltage range determined by the values a and a third predetermined lower value c there is generated an output signal value of −1, corresponding, for example, to the code signal "01." For signal values greater than b, there is generated an output signal value +2, corresponding, for example, to a code signal value of "11." For input signal values less than c, there is generated the output signal value −2, corresponding, for example, to a code signal "00." The pre-emphasis of higher audio frequencies within the pass-band and the amplitude compression used to obtain a uniform frequency-amplitude energy distribution plus the formation of different quantization steps for very low and very high amplitude values allows the output of analogue-to-digital converter 7 to be generated as a pulse code modulated signal having a minimized loss of high frequency transmitted information, as opposed to the usual case, such as described in U.S. Pat. No. 3,688,221, to W. Fruhalf, issued Aug. 29, 1972, or as described in the *IEEE International Convention Record,* part 8, 1963, pages 260–265, wherein sampling rates in excess the Nyquist frequency are utilized and sampling at a rate less the Nyquist frequency results in unacceptable distortion by loss of high frequency information.

The resulting pulse code modulated signal at the output of analogue-to-digital converter 7 is now transmitted in known manner, such as the preferable non-return-to-zero (NRZ) modulation method described in the aforementioned *IEEE International Convention Record,* via a transmission path or network to a receiver or a receiving station where the transmitted signal is converted (i.e. decoded) in a known manner into an analogue signal by a digital-to-analogue converter (DAC) 9, such as described in U.S. Pat. No. 2,889,409 (FIG. 7, 11 or 12) or in U.S. Pat. No. 3,298,017, to M. Avignon et al, issued Jan. 10, 1967, which DAC 9 is constructed similar to ADC 7. A clock or timing device 18 delivers timing signals to DAC 9, which timing signals must have a clock frequency coinciding with the sequence frequency of pulses from ADC 7. DAC 9 has a non-linear expanding characteristic which cancels the non-linear compression of ADC 7. Thus, four-terminal network 10 serves to lower the amplitudes on the receiver side which have previously been increased on the transmitter side by four-terminal network 3, eliminating such amplitude increase. Low-pass filter output voltage Vw is coupled to a band-pass filter 11 with band-pass characteristics as previously described for band-pass filters 2 and 6, to attenuate all frequency components, including any DC component, not within the desired frequency band-pass. The output voltage signal from band-pass filter 11 has a symmetric, generally sinusoidal wave shape of approximately the same frequency as waveform of ADC voltage Vx. The output of band-pass filter 11 is coupled to a playback or reproduction device 12, which may be an electro-acoustical transducer in the form of a loud speaker. It should be understood that other suitable transducers are equally usable, and that amplifiers may be series coupled between band-pass filter 11 and playback device 12 as desired for necessary end use. Similarly, it should be understood that it is also possible to interpose amplifiers between digital-to-analogue converter 9, four-terminal network 10 and/or band-pass filter 11, as necessary.

There has just been described apparatus equipped with a transmitting and a receiving station for generating, converting and transmitting intelligence signals wherein the intelligence information is band limited and high frequency pre-emphasized to allow transmission of data obtained by sampling at less than the Nyquist frequency, yet resulting in a minimized loss of the high frequency portion of the intelligence information transmitted.

While the present invention has been described with reference to a preferred embodiment thereof, it should be understood that the invention is not to be limited by the disclosure herein, but is limited only by the appended claims.

What is claimed is:

1. The apparatus comprising:

a transducer for converting an acoustical signal into an analogue electrical signal;

band-limiting filter means for filtering out those components of said analogue electrical signal which fall above and below a predetermined frequency band;

emphasizing circuit means for adjusting the amplitude of those frequency components of said band limited analogue electrical signal falling within said predetermined frequency band such that the power of each of said frequency components is substantially equal;

syllabic amplitude compressor means for regulating the amplitude of said adjusted, band-limited analogue electrical signal, said syllabic amplitude compressor means having forward and backward acting regulation time constants, said forward acting time constant being greater than its backward acting time constant whereby said syllabic amplitude compressor means amplifies positive going changes in amplitude of the signal applied to its input at a rate which is faster than the rate at which it amplifies negative going changes in the amplitude of the signal applied to its input;

analogue-to-digital converter means having a non-linear quantization characteristic with smaller quantizing steps at signal input levels of smaller magnitude and larger quantizing steps at signal input levels of higher magnitude;

sampling means for causing said analogue-to-digital converter means to sample regulated, adjusted, band-limited electrical analogue signal at a sampling rate which is less than twice the maximum frequency of said predetermined frequency band to provide a digital output signal representative of said regulated, adjusted and bandlimited analogue signal.

2. Apparatus as claimed in claim 1, further including an amplitude limiting means coupled between said syllabic amplitude compressor means and a second filter means, said second filter means coupled between said amplitude limiting means and said analogue-to-digital converter means, said second filter means passing only those signals whose frequency are not greater than the highest frequency in said predetermined frequency band.

3. Apparatus as claimed in claim 1, wherein said analogue-to-digital converter means generates a two-bit binary code representative of the magnitude of an analogue voltage appearing at its input whenever said sampling means causes said analogue-to-digital converter to sample said regulated, adjusted, band-limited electrical analogue signal.

4. Apparatus as claimed in claim 1, wherein said emphasizing circuit means includes means for increasing the amplitude of the signal applied to said analogue-to-digital converter means by a total increase in value in the order of 10 to 30 dB for the maximum frequency of said predetermined frequency band, with respect to the analogue electrical signals applied to said band-limiting filter means.

5. Apparatus as claimed in claim 1, wherein said syllabic amplitude compressor means possesses a forward acting regulation time constant situated in the range between 100 and 500 milli-seconds and a backward acting regulation time constant situated in the range of between 20 and 80 milli-seconds.

6. Apparatus as claimed in claim 4, wherein said predetermined frequency band extends between 0.3 and 3 kHz, said emphasizing circuit means increases the amplitude of those frequency components of said band-limited analogue electrical signal with frequencies exceeding 1 kHz by a value which corresponds to a total amplitude increase of about 20 dB, said syllabic amplitude compressor means having forward acting regulation time constant being approximately 150 milli-seconds and a backward acting regulation time constant being approximately 50 milli-seconds and said sampling means causing said analogue-to-digital converter means to sample said regulated, adjusted, band-limited electrical analogue signal at a frequency of approximately 1.6 times the maximum frequency of said predetermined frequency band.

7. Apparatus as claimed in claim 1, further including a digital-to-analogue converter means which receives the signals generated by said analogue-to-digital converter means, said digital-to-analogue converter means has a non-linear expanding characteristic which cancels a non-linear compression produced by said analogue-to-digital converter means, second emphasizing circuit means for compensating for the adjustments to the amplitude of the frequency components of the band-limited analogue electrical signal by said first emphasizing circuit means, filter means for passing only those components of said analogue electrical signal which fall within said predetermined frequency band, and an electro-acoustical transducer means for receiving such signals.

* * * * *